(No Model.) 2 Sheets—Sheet 1.

L. L. MAXHIMER.
SACK SCALE.

No. 495,897. Patented Apr. 18, 1893.

WITNESSES
Harry King
E. O. Weed

INVENTOR
L. L. Maxhimer
By F. C. Somes
Attorney (No Model.) 2 Sheets—Sheet 2.
L. L. MAXHIMER.
SACK SCALE.

No. 495,897. Patented Apr. 18, 1893.

WITNESSES
Harry King

INVENTOR
L. L. Maxhimer
By F. C. Somes
Attorney

UNITED STATES PATENT OFFICE.

LEONARD L. MAXHIMER, OF JUSTUS, OHIO, ASSIGNOR OF ONE-HALF TO WELLINGTON S. LASH, OF SAME PLACE.

SACK-SCALE.

SPECIFICATION forming part of Letters Patent No. 495,897, dated April 18, 1893.

Application filed July 30, 1892. Serial No. 441,735. (No model.)

*To all whom it may concern:*

Be it known that I, LEONARD L. MAXHIMER, a citizen of the United States of America, residing at Justus, in the county of Stark and State of Ohio, have invented certain new and useful Improvements in Sack-Scales, of which the following is a specification.

The invention relates to a sack scale for holding and weighing bags of grain and other articles.

The object of my invention is to provide a simple, compact and durable sack holder and scale that will readily allow the sack to be filled without the necessity of holding the mouth of the bag open by hand, and which will weigh the bag and its contents when the sack has been partially or completely filled.

Figure 1:
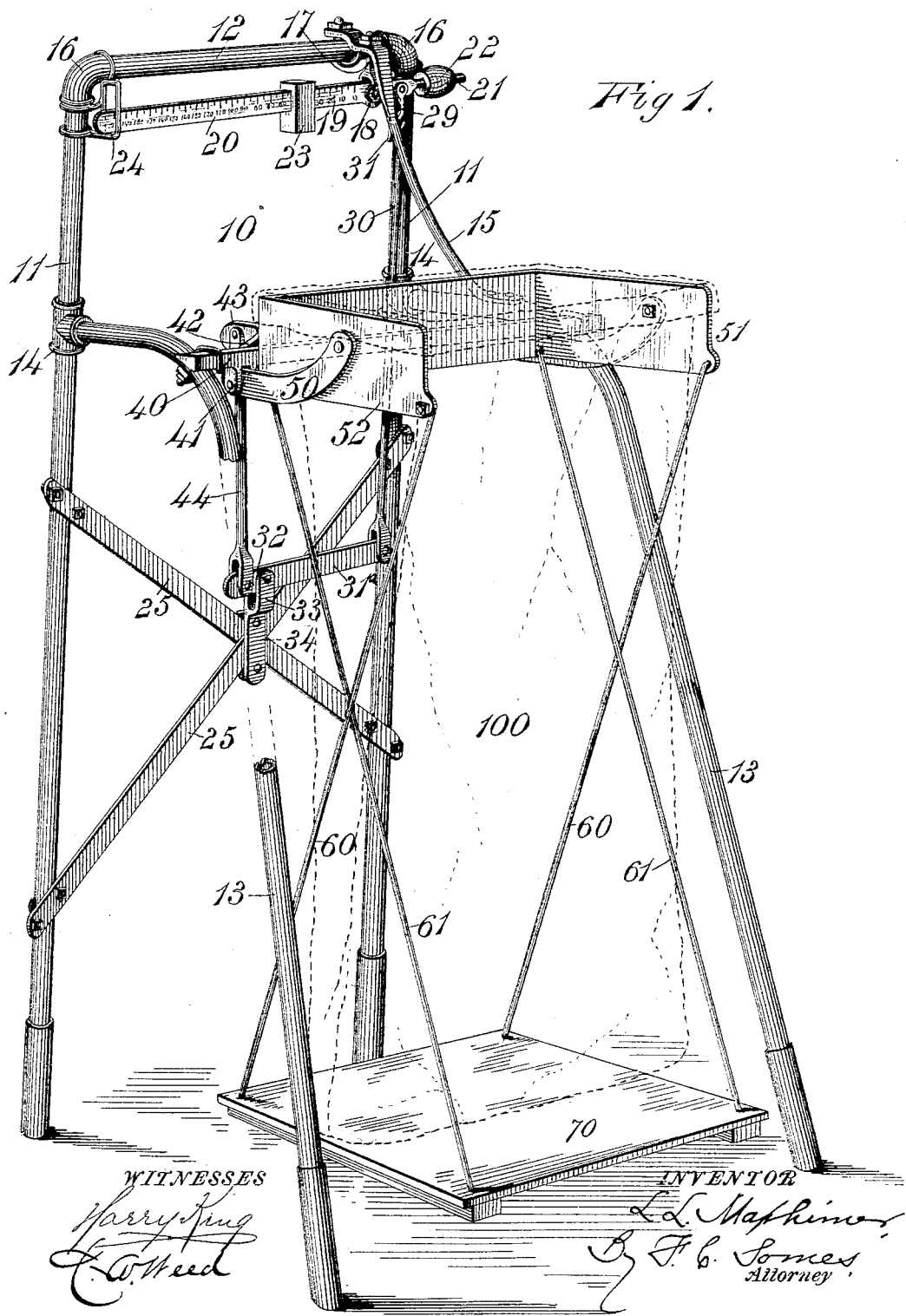
Figure 2:
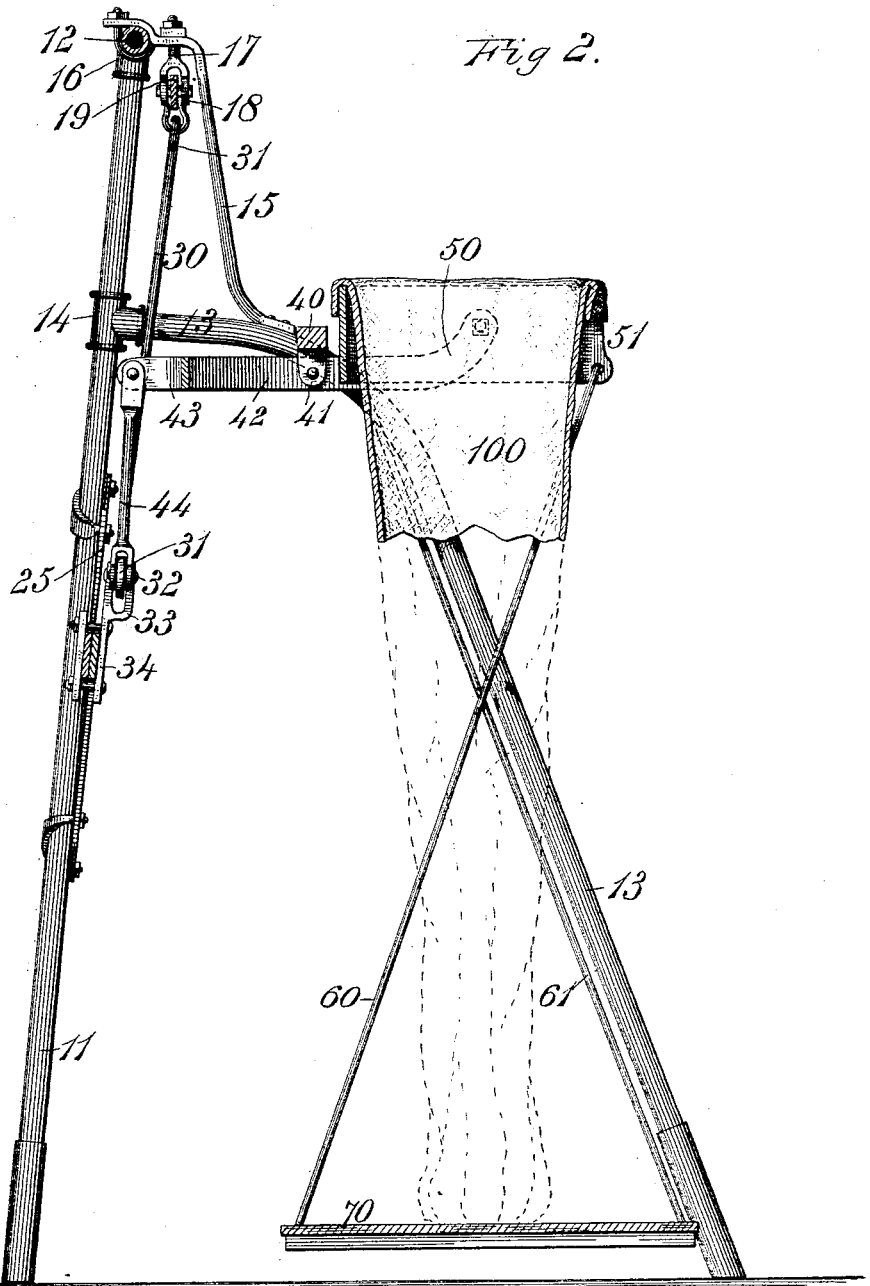

Figure 1 represents a perspective elevation of my improved sack holder and scale, a portion of the standard being broken away. Fig. 2 represents a side elevation partly in section, taken on line 2—2 of Fig. 1.

Similar numerals of reference indicate corresponding parts in the different figures.

The frame 10 of this improved sack holder and scale is composed of any suitable material, preferably of pipe, such as gas pipe, and comprises two rear standards or legs, a horizontal cross bar 12 connected with the upper ends of said standards by suitable couplings 16, and two inclined front standards or legs 13, 13, curved at their upper ends and extending backward horizontally and attached to the rear legs 11—11 by suitable couplings 14—14 disposed at the proper elevation according to the height of the scale needed. An L-shaped curved brace bar 15, is bolted to the horizontal bar 12, and to one of the front legs 13. A downwardly projecting arm 17 is bolted to the horizontal portion of the L-shaped bar near the cross bar 12, and at the lower end of this arm 17, a clevis 18 is formed. Pivoted to swing in this clevis is a scale beam 19 provided with a graduated scale 20. A screw threaded extension 21, projects from the end of said scale beam near the clevis, and a weight 22, is screwed onto this extension for balancing the scale beam. A sliding weight 23 is adjustable on the graduated scale 20. A guard 24, comprising a rectangular wire frame is connected to one of the upright standards 11, and one end of the scale beam is adapted to move in said frame.

Two cross bars 25, forming an X, are bolted to the upright standards 11.11. A dependent link 29 is pivoted to the scale beam near its inner end between the clevis 18 and the screw threaded extension 21. A rod 30 provided with a hook 31 is hooked into the link 29 and extends downward therefrom being pivoted at its lower end to a horizontal bar 31ª. The bar 31ª is fulcrumed at 32, in a clevis 33 which is connected by a bolted extension 34 to the bars 25 at their crossing point. A cross bar 40 is bolted to the legs 13 near their upper ends, and is provided inside said legs with two lugs 41. Bent arms 42 are fulcrumed in the lugs 41, and project rearwardly from the cross bar 40. The rear ends of these bent arms form extensions 43 which are bolted together and connected to the bar 31ª, by a rod 44. The front portion of these bent arms form curved supports 50 for the sack holder 51.

The sack holder comprises an approximately rectangular frame 52 having an open front to the sides of which the curved supports 50 are bolted. Two rods 60 and 61, are bolted to swing from each side of the frame, near the ends thereof, and cross each other at or near the center connecting the four corners of a rectangular platform 70.

In the operation of this device the empty bag 100 is placed in the rectangular frame 52, a portion of the sack at the mouth thereof being lapped over the frame, and the sack is then ready to receive its contents. The sliding weight is adjusted on the scale beam to the number of pounds desired, the grain or other article is then poured into the sack. When the grain in the sack equals the weight marked by the sliding weight on the scale beam the sack holder 52 swings down moving the rear ends 43 of the bent arms 42 up, together with the rod 44, swinging the fulcrumed lever 31ª, and tipping the scale beam by means of the hooked rod 30. The sack is then removed from the scale holder, the scale beam and sack holder returning to its normal position ready to receive another sack.

I claim as my invention—

1. In a sack scale the combination of a supporting frame, a scale beam thereon, a sack holder comprising an approximately rectangular frame, a cross bar on said supporting frame, bent arms fulcrumed on said cross bar, and pivoted to said holder, cross-bars connecting the rear standards of said supporting frame, a clevis bolted to said cross-bars at the point of crossing, a lever fulcrumed in said clevis, a rod connecting one end of said fulcrumed lever with the bent arms, and a hooked rod connecting the other end of said lever with the scale.

2. In a sack scale the combination of a supporting frame, a scale beam thereon, a sack holder comprising an approximately rectangular frame, a platform supported by said rectangular frame, a cross bar on said supporting frame, bent arms fulcrumed on said cross bar, and pivoted to said holder, cross bars connecting the rear standards of said supporting frame, a clevis bolted to said cross bars at the point of intersection, a lever fulcrumed in said clevis, a rod connecting one end of said fulcrumed lever with the bent arms, and a hooked rod connecting the other end of said lever with the scale.

LEONARD L. MAXHIMER.

Witnesses:
JOHN SPIDLE,
JOE BOMGARDNER.